US005703166A

United States Patent [19]
Rajagopalan et al.

[11] Patent Number: 5,703,166
[45] Date of Patent: Dec. 30, 1997

[54] GOLF BALL COMPOSITIONS BASED ON BLENDS OF OLEFINIC IONOMERS AND METALLOCENE CATALYZED POLYMERS

[75] Inventors: Murali Rajagopalan, South Dartmouth; Kevin Harris, New Bedford, both of Mass.

[73] Assignee: Acushnet Company, Fairhaven, Mass.

[21] Appl. No.: 482,514

[22] Filed: Jun. 7, 1995

Related U.S. Application Data

[63] Continuation-in-part of Ser. No. 377,553, Jan. 24, 1995, abandoned.

[51] Int. Cl.$^6$ ............................................. A63B 37/12
[52] U.S. Cl. ..................... 525/196; 525/221; 473/351; 473/372; 473/373; 473/385; 273/DIG. 22
[58] Field of Search .......................... 525/196, 221; 473/351, 372, 373, 385; 273/235, DIG. 22

[56] References Cited

U.S. PATENT DOCUMENTS

| | | | |
|---|---|---|---|
| 3,572,722 | 3/1971 | Harrison et al. | 525/221 |
| 4,884,814 | 12/1989 | Sullivan | 273/235 R |
| 5,187,013 | 2/1993 | Sullivan | 428/407 |
| 5,312,857 | 5/1994 | Sullivan | 524/400 |
| 5,338,610 | 8/1994 | Sullivan | 428/407 |
| 5,367,028 | 11/1994 | Hamada et al. | 525/221 |
| 5,397,840 | 3/1995 | Sullivan et al. | 525/221 |

OTHER PUBLICATIONS

P.S. Chum et al., "Structure/Property Relationships in Polyolefins Made by Constrained Geometry Catalyst Technology," Plastics Engineering, Jun. 1995, pp. 21–23.

Jan H. Schut, "Competition for Metallocenes Could Turn Ugly," Plastics World, Jan. 1995, pp. 33–36.

Robert D. Leaversuch, "Metallocene Resins: Is the Revolution for Real?" Modern Plastics, Jun. 1994, pp. 48–50.

Exxon Chemical Co., "Exact Facts," Exxpol Technology, Jun. 1994 pp. 1–8.

T.C. Yu et al., "Polyolefin Modification with EXACT™ Plastomers," SPE RETEC Polyolefins VIII Conference, Feb. 1993.

Matthew H. Naitove, "Novel Rheological Behavior Claimed for New–Tech Polyolefins," Plastics Technology, Nov. 1992, pp. 23 & 25.

*Primary Examiner*—Thomas R. Weber
*Attorney, Agent, or Firm*—Pennie & Edmonds LLP

[57] ABSTRACT

The disclosed invention provides novel golf ball compositions which contain olefinic based ionomers and non-ionic olefinic copolymers produced by use of metallocene catalysts. These compositions exhibit improved mechanical properties such as tensile and flexural properties. Golf balls which employ these blends provide ball properties and performance similar to and in some cases better than the state of the art ionomer based golf balls.

29 Claims, No Drawings

GOLF BALL COMPOSITIONS BASED ON BLENDS OF OLEFINIC IONOMERS AND METALLOCENE CATALYZED POLYMERS

This application is a continuation-in-part of U.S. application Ser. No. 08/377,553 filed Jan. 24, 1995, now abandoned.

BACKGROUND OF THE INVENTION

The present invention is directed to novel golf ball compositions which contain blends of ionomers and non-ionic polyolefin polymers produced using metallocene catalysts. Surprisingly, these compositions exhibit improved mechanical properties such as tensile and/or flexural properties. Golf balls having some amount of the subject copolymers in their covers also show improved performance properties over prior art golf balls. (See U.S. Pat. No. 5,397,840.)

Until about 1968 most golf ball covers were made of a naturally occurring rubber called balata or gutta percha, a packing material traditionally used for transporting cargo. Balata was the preferred material as it is soft material and is easy to use in manufacturing processes. Also balata can give a golf ball the potential for high spin and controllability. In 1968 DuPont introduced an ethylene-methacrylic acid based ionomer under the trade name SURLYN® which is now used extensively in golf ball cover compositions. These ionomers made it possible to produce golf balls having ranges of properties such as spin, coefficient of restitution, cut resistance and initial velocity, that were previously not possible using Balata covered golf balls. By 1976 approximately sixty percent of golf balls used SURLYN® in their covers.

While SURLYN® and ethylene-acrylic acid based ionomers, manufactured and sold by Exxon under the trade name IOTEK®, improved the variety and type of golf balls available, there is a continuing need in the golf ball art for materials which can be used in the core and covers of golf balls, which offer improved golf ball properties (performance) such as spin, cut and shear resistance and durability.

In addition, while different blend combinations of species of one variety of polymer such as SURLYN® have been successfully used in the prior art, different polymers, such as balata and SURLYN®'s have not been successfully blended for use in golf ball covers. In general, most (or a majority of) prior art mixtures of polymer components are immiscible or incompatible unless strong interactions are present between the polymer components in the mixture. This lack of compatibility exists when a copolymer of ethylene with methacrylic acid neutralized by metallic oxides such as are present in SURLYN® is blended with a homopolymer such as a polyolefin that is not produced with a metallocene catalyst. These mixtures often have poor tensile strength, impact strength, and the like. Hence, the golf balls produced from these incompatible mixtures will have inferior golf ball properties such as poor durability, cut resistance, and so on.

There is a need in the golf art for different polymers that are capable of being blended and successfully used in golf ball covers and cores.

Their is also a continuing need in the golf ball art for covers which provide golf balls having improved properties such as spin, durability and "click and feel".

SUMMARY OF THE INVENTION

The present invention relates to golf balls, including those comprising a cover and a core, wherein the cover comprises at least partially miscible blend of at least one, and preferably two or more, ionomer resins with at least one polyolefin resin. In the golf ball covers of the invention, ionomer resins are typically blended with one or more non-ionic copolymers of an olefin with attached lower alkyl groups having from about 1 to about 18 carbon atoms. The olefin polymers useful in the invention are produced using metallocene catalyst technology, and, thus, for the purpose of this application these polymers will be referred to as metallocene catalyzed polymers, copolymers, and terpolymers.

Typically, the metallocene catalyzed polymers that may be blended with ionomers to form the golf ball covers of the invention are of the formula:

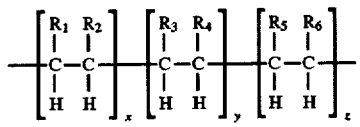

wherein $R_1$ is hydrogen;

$R_2$ is hydrogen or lower alkyl selected from the group consisting of $CH_3$, $C_2H_5$, $C_3H_7$, $C_4H_9$, and $C_5H_{11}$;

$R_3$ is hydrogen or lower alkyl selected from the group consisting of $CH_3$, $C_2H_5$, $C_3H_7$, $C_4H_9$, and $C_5H_{11}$;

$R_4$ is selected from the group consisting of $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic; and $R_6$ is hydrogen, lower alkyl including $C_1$–$C_5$, carbocyclic, aromatic or heterocyclic; wherein x ranges from 99 to 50 weight per cent of the polymer; y ranges from 1 to 50 weight per cent of the polymer; and z ranges from 0 to 49 weight per cent of the polymer. The ranges of x, y and z can be determined based on the relative weights of the initial monomers used. If z is 0, one has a copolymer of the units containing $R_1$, $R_2$, $R_3$ and $R_4$. The term polymer as used herein shall encompass compounds in which z=0 and in which z is not zero. The schematic depiction given above, and the depictions which follow, are given to define the monomer units, and the relative abundances thereof, and do not imply a chemical structure or a scheme of linkage among the monomer units.

Typically, the compositions useful in the golf ball covers of the invention comprise from about 99 to 1 percent of at least one ionomer resin of an ethylene-methacrylic acid or ethylene-acrylic acid copolymer, neutralized by mono-, di-, or tri-valent metallic derivatives; and from about 1 to 99 percent of at least one non-ionic metallocene catalyzed copolymer of an olefin with a lower alkyl substituent having from about 1 to about 18 carbon atoms. Preferably, the golf ball cover compositions of the invention provide improved spin, and comprise about 95 to 30 percent ionomer and about 5 to 70 percent metallocene copolymer, most preferably, about 95 to 50 percent ionomer and about 5 to 50 percent metallocene catalyzed copolymer. The ionomer resins useful in the present invention typically have a flexural modulus of from about 50 psi to about 150,000 psi, and the non-ionic metallocene catalyzed polymers have a flexural modulus of from about 500 psi to 200,000 psi.

Preferred metallocene polymers include copolymers in which the monomers are selected from the group consisting of butene, hexene, and octene. Other preferred metallocene catalyzed copolymers include copolymers of ethylene, butene, hexene, or norbornene. Most preferred are a copolymer of ethylene and butene, a copolymer of butene and hexene, a copolymer of ethylene and octene, and a copolymer of ethylene and norbornene. The preferred metallocene catalyzed terpolymer is a polymer of ethylene, propylene and a diene monomer.

It has been unexpectedly discovered that, in particular, golf ball covers comprising a preferred blend of an ionomer with an ethylene-butene, ethylene-hexene, or ethylene-octene based metallocene catalyzed copolymers at different concentrations provide golf balls with an improved spin rate and durability that is not found with prior art ionomer-polyolefin blends.

The golf ball covers of the invention are typically formed around a core having a diameter of 1.58 inches. Finished golf balls have a diameter of from about 1.68 to about 1.80 inches, preferably, about 1.710 to about 1.730 inches. The core may be either a single, solid piece of material or a solid or liquid center at least partially covered with a wound thread. The finished golf balls may also have multiple cover layers or multiple core layers.

DETAILED DESCRIPTION OF THE INVENTION

As used herein, the term "metallocene polymer" refers to any polymer, copolymer, or terpolymer useful in the present invention that is formed using metallocene catalyst technology.

Until about 1968 golf balls were made from naturally occurring or synthetic trans polyisoprene compositions, i.e., balata. These compositions were relatively soft and conferred a high degree of spin as well as good click and feel to a golf ball. Cut resistance was not ideal, however, and a player using a balata covered golf ball had to change balls often. SURLYN® and blends of different SURLYN® used to manufacture golf balls allowed the production of golf balls having good cut resistance and improved initial velocity. The present invention brings to light the surprising discovery that golf ball covers and cores can be made using blends of at least one ionomer and one or more metallocene catalyzed polymers having the formula:

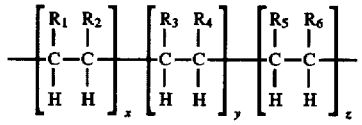

wherein $R_1$ is hydrogen, branched or straight chain alkyl such as methyl, ethyl, propyl, butyl, pentyl, hexyl, heptyl, and octyl, carbocyclic, aromatic or heterocyclic;

$R_2$ is hydrogen, lower alkyl including $C_1-C_5$;

carbocyclic, aromatic or heterocyclic $R_3$ is hydrogen, lower alkyl including $C_1-C_5$, carbocyclic, aromatic or heterocyclic;

$R_4$ is selected from the group consisting of $C_nH_{2n+1}$, for n=1 to 18 (which includes $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$) and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;

$R_5$ is hydrogen, lower alkyl including $C_1-C_5$, carbocyclic, aromatic or heterocyclic;

$R_6$ is hydrogen, lower alkyl including $C_1-C_5$, carbocyclic, aromatic or heterocyclic; and wherein x, y and z are the relative percentages of each co-monomer. The number x can range from 1–99 percent or more preferably from 10–70 percent and most preferred, from about 10–50 percent. The number y can be from 99–1 percent, preferably, from 90–30 percent, or most preferably, 90–50 percent. The number z can range from 0 to 49 percent.

Residual metallocene catalyst may also be present in the subject composition as these catalysts are used in the manufacture of the metallocene catalyzed co-polymers that are useful in the golf ball cover and core compositions of the present invention.

In the preferred metallocene catalyzed copolymer, $R_1$ is hydrogen or lower alkenyl, $R_2$ is hydrogen or alkyl, including carbon chains having from 1 to 10 carbon atoms, $R_3$ is hydrogen or lower alkyl or alkenyl such as carbon chains having 1–10 carbon atoms, and $R_4$ is a lower alkyl group having from 1–10 carbon atoms. For terpolymers, where z is not zero, $R_5$ is preferably hydrogen or lower alkyl or alkenyl such as carbon chains having 1–10 carbon atoms, and $R_6$ is a lower alkyl group having from 1–10 carbon atoms. In the most preferred copolymer, $R_1$ and $R_2$ are hydrogen, $R_3$ is hydrogen, methyl, ethyl, propyl, butyl, pentyl, hexyl, heptyl or octyl, and $R_4$ is a straight carbon chain having 6 carbon atoms. For terpolymers, $R_5$ is most preferably hydrogen, methyl, ethyl, propyl, butyl, pentyl, hexyl, heptyl or octyl, and $R_6$ is a straight carbon chain having 6 carbon atoms.

The subject metallocene catalyzed copolymers can be random or block copolymers and may be made by blending two, three, four, five or more different monomers according to processes well known to one of ordinary skill in the art. Additionally, the subject metallocene catalyzed polymers may be isotactic, syndotactic or atactic, or any combination of these forms of types of polymers. The pendant groups creating the isotactic, syndotactic or atactic polymers are chosen to determine the interactions between the different polymer chains making up the resin to control the final properties of the resins used in golf ball covers. Aromatic and cyclic olefins can be used in the present invention as well as such specific groups as methyl and phenyl.

As used herein, the phrase linear chain or branched chained alkyl groups of up to about 30 carbon atoms means any substituted or unsubstituted acyclic carbon-containing compounds, including alkanes, alkenes and alkynes. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, propyldiene, butylene, butyldiene, pentene, hexene, heptene, octene, norbornene, nonene, decene and the like. The ordinary skilled artisan is familiar with numerous linear and branched alkyl groups, which are within the scope of the present invention.

In addition, such alkyl group may also contain various substituents in which one or more hydrogen atoms has been replaced by a functional group. Functional groups include but are not limited to hydroxyl, amino, carboxyl, sulfonic amide, ester, ether, phosphates, thiol, nitro, silane and halogen (fluorine, chlorine, bromine and iodine), to mention but a few.

As used herein, substituted and unsubstituted carbocyclic groups of up to about 20 carbon atoms means cyclic carbon-containing compounds, including but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom. For example, in a specific embodiment, $R_2$ is cyclohexanol.

As used herein, substituted and unsubstituted aryl groups means a hydrocarbon ring bearing a system of conjugated double bonds, usually comprising six or more even number of $\pi$ (pi) electrons. Examples of aryl groups include, but are not limited to phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can include nitro groups.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphenylbutyl.

The metallocene catalyzed copolymers useful in the present invention are commercially available under the trade name AFFINITY® polyolefin plastomers and ENGAGE® polyolefin elastomers by Dow Plastics Company and they are described more fully in U.S. Pat. Nos. 5,272,236 and 5,278,272 which are herein incorporated by reference in their entirety. Other commercially available metallocene catalyzed polymers can be used such as Exxon's Exact® and Dow's Insight® line of resins which have superior flexibility and clarity as well as toughness. The Exact® and Insight® line of polymers also have novel rheological behavior in addition to their other properties as a result of using a metallocene catalyst technology. The method of making EXACT® and INSIGHT® polymers and their compositions are more fully detailed in U.S. Pat. Nos. 5,359,015 and 5,281,679.

Other polymers may also be used in golf ball covers according to the present invention. In particular, any of the polymers that are disclosed in U.S. Pat. Nos. 2,924,593, 5,055,438 and 5,324,800 may be used in golf ball covers according to the subject invention.

The golf ball compositions of the present invention comprise metallocene catalyzed polymers blended with an ionomer according to blending methods well known in the art for use in golf ball covers. In particular, the metallocene catalyzed polymers of the present invention are combined with polymers such as ethylene methacrylic acid ionomers, and ethylene acrylic acid ionomers, and their terpolymers, currently sold commercially under the trade names SURLYN® and IOTEK® by DuPont and Exxon respectively. These and other polymers and ionomers are described in U.S. Pat. No. 5,155,157 and Canadian Patent 963,380. Other polymers which can be used in conjunction with the ethylene metallocene catalyzed polymers of the claimed invention in golf ball covers include: poly(ethylethylene), poly(heptylethylene), poly(hexyldecylethylene), poly(isopentylethylene), poly(1,1-dimethyltrimethylene), poly(1,1,2-trimethyltrimethylene), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly[1,1-bis(trifluoromethoxy)difluoroethylene], poly(methoxyethylene), poly(pentyloxyethylene), poly(1,1-dichloroethylene), poly(cyclopentylacetoxyethylene), poly(4-[(2-butoxyethoxy)methyl]styrene), poly(4-dodecylstyrene), poly(4-tetradecylstyrene), poly(phenetylmethylethylene), poly[oxy(allyloxymethyl)ethylene], poly[oxy(ethoxymethyl)ethylene], poly(oxyethylethylene), poly(oxytetramethylene), poly(oxytrimethylene), poly(oxycarbonylpentamethylene), poly(oxycarbonyl-3-methylpentamethylene), poly(oxycarbonyl-1,5-dimethylpentamethylene), poly(oxy-2,2,3,3,4,4-hexafluoropentamethyleneoxyadipoyl), poly[oxy(methyl)-3,3,3-trifluoropropylsilylene-3p3-difluoropentamethylene(methyl)-3,3,3-trifluoropropylsilylene], poly(silanes) and poly(silazanes), main-chain heterocyclic polymers and poly(furan tetracarboxylic acid diimides) as well as the classes of polymers to which they belong.

The preferred golf ball compositions comprise one or more ionomer resins having a flexural modulus of from about 50 psi to about 150,000 psi and a non-ionic metallocene catalyzed copolymer of an olefin having a flexural modulus of from about 500 psi to 200,000 psi. In a most preferred embodiment of the present invention EXACT® 4033 is combined with IOTEK® 7030 or SURLYN® 7940 to form combination blends suitable for use in golf ball covers or cores.

The amounts of polymers used in the subject invention can vary from 1 to 99 percent of the metallocene catalyzed polymers to 99 to 1 percent of other polymers or ionomers which can be used in golf ball covers. More preferred ratios of 95 to 5 percent of the metallocene catalyzed polymers with 5 to 95 percent of other polymer. Most preferred is from about 95 to about 30 of the subject metallocene catalyzed polymers and from about 5 to about 70 of other polymer or ionomer.

Further compositions may also be added to the blends of the invention, such as, for example; coloring agents, reaction enhancers, crosslinking agents, dyes, lubricants, fillers, excipients, process aids and other compounds commonly added to polymeric materials and/or golf ball covers.

The subject metallocene catalyzed polymer-ionomer blends can be used in any type of golf ball. In particular, two-piece golf balls consisting of a cover surrounding a core are within the scope of the present invention. Further, wound golf balls, in which a liquid, semi-solid or solid core is surrounded by an elastic synthetic material are also contemplated for use in the present invention. The subject metallocene catalyzed-ionomer blends may also be used in golf balls having multiple cover and/or core layers.

The present invention can be used with golf balls of any size. While USGA specifications limit the size of a competition golf ball to more than 1.680 inches in diameter, golf balls of any size can be used for leisure golf play. The preferred diameter of the golf balls is from about 1.680 inches to about 1.8000 inches. The more preferred diameter is from about 1.680 inches to about 1.760 inches. A diameter of from about 1.680 inches to about 1.740 inches is most preferred, however diameters anywhere in the range of from 1.70 to about 1.95 inches can be used. Oversize golf balls above about 1.760 inches to golf balls having diameters as big 2.75 inches are also within the scope of the present invention.

Any golf ball core material can be used in the present invention. Preferred cores include some amount of cis-butadiene.

Golf ball covers made in accordance with the present invention are made in a conventional manner by molding cover stock about a core. Molding is accomplished either by injection molding cover stock about a core or by compression molding preformed half-shells about a core. The preferred method is compression molding. Half-shells are made by injection molding a cover stock into a conventional half-shell mold in a conventional manner.

The preformed half-shells are then placed about a core and the assembly is introduced into a compression molding machine. The compression molding machine is a hydraulic press having an upper and lower mold plate. As taught by U.S. Pat. No. 4,508,309 issued Apr. 2, 1985, such mold plate have half molds, each of which is registered with another half mold in the opposite mold plate. It has been found that a golf ball is formed with a cover in accordance with the present invention when the half-shells are compression molded about a core at about 250° to 400° F. The molded balls are then cooled while still in the mold and finally removed when the cover is hard enough to be handled without deforming.

After the balls have been molded, they undergo various conventional finishing operations such as buffing, painting and stamping.

Blending of the metallocene catalyzed polymer and ionomer resins is accomplished in a conventional manner using conventional equipment. Good results have been obtained by mixing the metallocene catalyzed polymer and ionomer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding about a core or for molding flowable cover stock about a core using a retractable-pin mold. Such machines are conventional.

These and other aspects of the present invention may be more fully understood by reference to the following examples.

While these examples are meant to be illustrative of golf balls made according to the present invention, the present invention is not meant to be limited by the following examples. All parts are by weight unless otherwise specified.

Formulations containing the components IOTEK® 7030 (a copolymer of ethylene and acrylic acid neutralized by zinc oxide) with EXACT® 4033 (a metallocene catalyzed copolymer of ethylene with 1-butene) and the compatibilizer ATX 320® were developed according to the present invention.

Table I summarizes the physical properties of these components used in the blends.

TABLE I

Physical properties of various components used in the blends

| Property | Iotek 7030 | Escor ATX 320 | Exact 4033 | Surlyn 7940 | Surlyn 8320 |
|---|---|---|---|---|---|
| Hardness (Shore-D or A) | 55 D | 83 A | 85 A | 68 D | 84 A |
| Tensile Strength, psi | 3500 | 1800 | 3000 | 3800 | 3100 |
| Tensile strain at break, % | 395 | >800 | 620 | 285 | 770 |

TABLE I-continued

Physical properties of various components used in the blends

| Property | Iotek 7030 | Escor ATX 320 | Exact 4033 | Surlyn 7940 | Surlyn 8320 |
|---|---|---|---|---|---|
| Tensile modulus, psi | NA | 1300 | 720 @ 300% strain | NA | NA |
| Flexural modulus, psi | 16,000 | 3700 | 3300 | 61000 | 2800 |

Tensile and flexural test samples are produced by injection molding of the formulations by following a standard operating procedure. The test samples are annealed in an air circulating oven at 140° F. for 24 hours, followed by conditioning at room temperature for seven days before testing. Both tensile and flexural measurements were carried out by following ASTM D638 and D790 procedures, respectively.

Golf ball covers are produced by injection molding by following a routine molding procedure. Cores measuring about 1.580 inch diameter are used to make golf balls by compression molding of the cover composition about the core.

After completion of the ball molding process, the balls are buffed, sand blasted and painted for evaluation. Hardness, PGA compression, spin, velocity, shear resistance, durability using a dual pendulum, ink and paint durability tests are performed on the finished balls. These results are shown in Table III.

The tensile, flexural, hardness and flow properties of the blends based on IOTEK® 7030 and EXACT® 4033 are summarized in Table II. Properties from blends 1 and 2 were used as a control. Although Shore-D hardness and tensile modulus decreases as EXACT® 4033 level increases for blend 5, tensile strength surprisingly was much higher than for blends 2 through 4. Also, a significant increase in the % strain at break value was obtained for blend 5.

Blends of polymers including EXACT® 4033 and IOTEK® 7030 ionomer, exhibit excellent properties when used in golf ball covers which is unexpected since EXACT® 4033 material is hydrophobic whereas IOTEK® 7030 is hydrophilic. Although Shore-D hardness decreases with increases in EXACT® 4033 level in the blends, surprisingly both initial velocity and coefficient of restitution (COR) remain constant for blends 3 through 5. See Table III. These results are unusual since initial velocity tends to decrease as hardness decreases.

TABLE II

Comparison of various physical properties of blends based on Iotek ® 7030 ® with Exact ® 4033.

| | Blend 1 | Blend 2 | Blend 3 | Blend 4 | Blend 5 |
|---|---|---|---|---|---|
| Ingredients | | | | | |
| Iotek 7030 | 100 | 90 | 80 | 70 | 50 |
| ATX 320 | — | 10 | 10 | 10 | 10 |
| Exact 4033 | — | — | 10 | 20 | 40 |
| White concentrate | 5 | 5 | 5 | 5 | 5 |
| Physical Properties | | | | | |
| Hardness (Shore-D) | 58 | 56 | 60 | 50 | 45 |
| Tensile strength at break, psi | 2701 | 2453 | 2174 | 2383 | 2899 |
| Tensile strain at break, % | 393 | 441 | 412 | 556 | 875 |
| Tensile modulus, kpsi | 17.7 | 15.3 | 14.4 | 12.2 | 7.4 |

TABLE II-continued

Comparison of various physical properties of
blends based on Iotek ® 7030 ® with Exact ® 4033.

|  | Blend 1 | Blend 2 | Blend 3 | Blend 4 | Blend 5 |
|---|---|---|---|---|---|
| Flexural modulus, kpsi | 36.2 | 32.3 | 29.9 | 26.4 | 21.7 |
| Melt flow index at 185 deg. C., g/10 min | 5.3 | 6.2 | 5.5 | 4.3 | 3.1 |

Note:
Tensile properties were measured from the ball covers.

In general, in the golf ball art, durability decreases as the non-ionic olefin component increases in an ionomer blend. Also, as mentioned above, durability of blends of ionomers with a homopolymer such as polyethylene is poor (failed after 5 to 10 hits) due to incompatibility of these components. However, the present invention unexpectedly shows that it is possible to obtain improved durability for golf ball cover compositions containing EXACT® 4033 in various compositions.

A significant increase in the spin rate from the driver and 5-iron was obtained for balls which contain blends of metallocene catalyzed polymer and ionomers in the cover compositions.

TABLE III

Comparison of various golf ball properties of
blends based on Iotek 7030<sup>R</sup> with Exact<sup>R</sup> 4033.

| Physical and Ball Properties | Blend 1 | Blend 2 | Blend 3 | Blend 4 | Blend 5 |
|---|---|---|---|---|---|
| Hardness (Shore-D) | 65 | 60 | 60 | 57 | 55 |
| PGA compression | 104 | 103 | 102 | 101 | 100 |
| Spin rate from the driver, rpm | 3264 | 3254 | 3404 | 3526 | 3885 |
| Spin rate from the 5-iron, rpm | 7653 | 7807 | 8100 | 8197 | 9103 |
| Initial velocity, ft/s | 252.7 | 252.7 | 252.6 | 252.6 | 252.7 |
| Coefficient of restitution | 0.802 | 0.801 | 0.799 | 0.804 | 0.800 |
| Durability at room temperature, # hits to 50% failure | 150 | 400 | 200 | 250 | 400 |

More recently, a study was initiated to displace the low modulus Surlyn® 8320 ionomer by EXACT® 4033 in the blend formulations as described in Table IV; a blend 8 containing 9.5 wt % of ATX 320® was included in this study in order to find out whether the ATX 320® is necessary to achieve acceptable mechanical and ball properties.

Tensile strength and % strain at break increases for blends containing the EXACT® 4033 yet still has a higher tensile modulus than the low modulus SURLYN® 8320 blend as indicated in Table IV. This behavior is unexpected.

TABLE IV

Comparison of various physical properties of cover blends based on
Surlyn 7940<sup>R</sup> with Surlyn<sup>R</sup> 8320 and Exact<sup>R</sup> 4033

| Ingredients | Blend 6 | Blend 7 | Blend 8 |
|---|---|---|---|
| Surlyn 7940 | 55 | 55 | 50 |
| Surlyn 8320 | 45 | — | — |
| Exact 4033 | — | 45 | 40 |
| ATX 320 | — | — | 10 |
| White concentrate | 5 | 5 | 5 |
| Physical Properties |  |  |  |

TABLE IV-continued

Comparison of various physical properties of cover blends based on
Surlyn 7940<sup>R</sup> with Surlyn<sup>R</sup> 8320 and Exact<sup>R</sup> 4033

| Ingredients | Blend 6 | Blend 7 | Blend 8 |
|---|---|---|---|
| Tensile strength at break*, psi | 2792 | 3425 | 3455 |
| Tensile strain at break*, % | 570 | 777 | 763 |
| Tensile modulus *, kpsi | 14.2 | 13.1 | 13.3 |

Note: *Tensile properties were measured from the ball covers instead of molded specimens.

A significant increase in the spin rate from the driver is indicated for the blends containing EXACT® 4033 in comparison to a blend containing the low modulus SURLYN® 8320 (see Table V).

Further, initial velocity and coefficient of restitution results were found to be slightly better for blends containing an ionomer and an ethylene polymer such as those containing the EXACT® 4033 component than the low modulus SURLYN® 8320 component.

Table V

Comparison of various golf ball properties of blends based on
Surlyn 7940<sup>R</sup> with Surlyn<sup>R</sup> 8320 and Exact<sup>R</sup> 4033

| Physical and Ball Properties | Blend 6 | Blend 7 | Blend 8 |
|---|---|---|---|
| Hardness (Shore-D) | 60 | 60 | 57 |
| PGA compression | 105 | 105 | 105 |
| Spin rate from the driver, rpm | 3526 | 3871 | 3896 |
| Spin rate from the 5-iron, rpm | 7974 | 8623 | 8568 |
| Initial velocity, ft/sec | 252.3 | 253.0 | 252.8 |
| Coefficient of restitution | 0.804 | 0.807 | 0.808 |
| Durability at room temperature, # hits | 400 | 400 | 400 |
| Number of balls failed after durability test | none | none | none |

It appears from the above study that the presence of ATX 320® did not contribute to further improvements in the ball properties.

In comparing balls with covers made from 52.4 wt. % Surlyn 7940/42.9 wt. % Surlyn 8320 to balls with covers in which the Surlyn 8320 was replaced by Exact 4033 or by Exact 4033 with Fusabond MB-110D, 226D or 280D, the balls with Exact 4033 had both a higher spin rate and better durability, as shown in Table VI. Thus, the 52.4 wt. % Surlyn 7940/42.9 wt. % Surlyn 8320 had a spin rate of 3362 rpm when hit by a driver/8657 rpm when hit by an 8-iron, while the 52.4 wt. % Surlyn 7940/42.9 wt. % Exact 4033 had corresponding spin rates of 3619 and 9150 rpm. In the hit test at room temperature, cracking was observed after 650 hits for the Surlyn 7940/Surlyn 8320 blend, but only after 1000 hits for the Surlyn 7940/Exact 4033 blend.

TABLE VI

Comparison of Golf Ball Properties For
Blends of Surlyn 7940, Surlyn 8320
with Exact 4033, FUSABOND Polymers

|  | #9 | #10 | #11 | #12 | #13 |
|---|---|---|---|---|---|
| I. Ingredients |  |  |  |  |  |
| Surlyn 7940 (15% Acid Ionomer-Li) | 55 | 55 | 55.0 | 55.0 | 55.0 |
| Surlyn 3320 (15% Acid Ionomer-Na) | 45 | — | — | — | — |

TABLE VI-continued

Comparison of Golf Ball Properties For
Blends of Surlyn 7940, Surlyn 8320
with Exact 4033, FUSABOND Polymers

|  | #9 | #10 | #11 | #12 | #13 |
|---|---|---|---|---|---|
| Exact 4033 | — | 45 | 45.0 | 45.0 | 45.0 |
| Fusabond MB-110D (Ethylene - 0.9 wt. % maleic anhydride melt flow index 30) | — | — | 10.0 | — | — |
| Fusabond MB-226D (Ethylene - 0.9 wt. % maleic anhydride melt flow index 1.5) | — | — | — | 10.0 | — |
| Fusabond MB-280D (EPDM with 2% maleic anhydride m.I. 5.0) | — | — | — | — | 10.0 |
| White Conc. | 5.0 | 5.0 | 5.0 | 5.0 | 5.0 |
| II. Performance |  |  |  |  |  |
| Hit Test at RT (50% fail) | 650 | 1000 | over 1000 | over 1000 | over 1000 |
| Cold Crack Test at 5° F. | No fail | No fail | No fail | No fail | No fail |
| Spin Rate from Driver (rpm) | 3362 | 3619 | 3408 | 3436 | 3599 |
| Spin Rate from 8 - Iron (rpm) | 8657 | 9150 | 8770 | 8753 | 9078 |

The information in Table VII establishes that low modulus Surlyn materials can be replaced by polymers discussed herein with little change in spin rate.

TABLE VII

Comparison of Golf Ball Properties
Of Surlyn ® Blends With Affinity ® PF 1140

| Ingredients | Surlyn 7940 | Surlyn 8320 | Affinity PF 1140 | White Concentrate | Spin Rate Driver (rpm) | Flex Modulus |
|---|---|---|---|---|---|---|
| A#1 | 92.5 | 7.5 | — | 5 | 3216 | 62.2 ± 1.67 |
| A#2 | 92.5 | 3.75 | 3.75 | 5 | 3304 | 55.9 ± 1.20 |
| A#3 | 85 | 15 | — | 5 | 3348 | 54.8 ± 1.70 |
| A#4 | 85 | 10 | 5 | 5 | 3221 | 56.4 ± 2.80 |
| A#5 | 85 | 7.5 | 7.5 | 5 | 3307 | 57.2 ± 2.60 |
| A#6 | 77.5 | 22.5 | — | 5 | 3281 | 46.8 ± 2.80 |
| A#7 | 77.5 | 15.0 | 7.5 | 5 | 3317 | 50.8 ± 1.40 |
| A#8 | 77.5 | 11.25 | 11.25 | 5 | 3346 | 48.7 ± 2.1 |
| A#9 | 55 | 45 | — | 5 | 3489 | 27.1 ± 2.2 |
| A#10 | 55 | 37.5 | 7.5 | 5 | 3421 | 24.6 ± 1.8 |
| A#11 | 55 | 30 | 15 | 5 | 3607 | 22.7 ± 2.9 |
| A#12 | 55 | 22.5 | 22.5 | 5 | 3497 | 23.4 ± 2.4 |
| A#13 | 95 | — | 5 | 5 | 3146 | 64.2 ± 3.4 |
| A#14 | 90 | — | 10 | 5 | 3288 | 68.1 ± 2.6 |

We claim:

1. A golf ball comprising a cover and a core wherein the cover comprises an at least partially miscible blend of at least one ionomer and at least one metallocene catalyzed polymer having the formula:

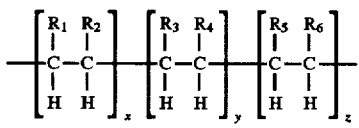

wherein $R_1$ is hydrogen;

$R_2$ is hydrogen or lower alkyl selected from the group consisting of $CH_3$, $C_2H_5$, $C_3H_7$, $C_4H_9$, and $C_5H_{11}$;

$R_3$ is hydrogen or lower alkyl selected from the group consisting of $CH_3$, $C_2H_5$, $C_3H_7$, $C_4H_9$, and $C_5H_{11}$;

$R_4$ is selected from the group consisting of $CH_3$, $C_2H_5$, $C_3H_7$, $C_4H_9$, $C_5H_{11}$, $C_6H_{13}$, $C_7H_{15}$, $C_9H_{19}$, $C_{10}H_{21}$, and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x ranges from 99 to 50 weight per cent of the polymer, y ranges from 1 to 50 weight per cent of the polymer and z ranges from 0 to 49 weight per cent of the polymer.

2. A golf ball comprising a core and a cover according to claim 1 wherein $R_2$ is hydrogen.

3. A golf ball composing a cover and a core according to claim 1 wherein the golf ball core has a diameter of about 1.58 inches.

4. A golf ball comprising a cover and a core according to claim 1 wherein the golf ball has a diameter of from about 1.68 to about 1.80 inches.

5. A golf ball comprising a cover and a core according to claim 1 wherein the golf ball has a diameter of from about 1.710 to about 1.730 inches.

6. A golf ball comprising a cover and a core according to claim 1 wherein the core is a single piece of material.

7. A golf ball comprising a cover and a core according to claim 1 wherein the core is a solid or liquid center at least partially covered with a wound thread.

8. A golf ball having a core and a cover, said cover comprising a blend of two or more ionomer resins with one or more non-ionic copolymers of an olefin with attached lower alkyl groups having from about 1 to about 18 carbon atoms said olefin comonomer produced using a metallocene catalyst.

9. A golf ball according to claim 8 having multiple cover or core layers.

10. A golf ball having a core and a cover wherein said cover comprises one or more ionomer resins having a flexural modulus of from about 50 psi to about 150,000 psi and a non-ionic metallocene catalyzed copolymer of an olefin having a flexural modulus of from about 500 psi to 200,000 psi.

11. A golf ball having a core and a cover wherein said cover comprises an at least partially miscible blend of at least one ionomer resin and at least one polyolefin resin, wherein the polyolefin resin is formed with a metallocene catalyst.

12. A golf ball having a core and a cover wherein said cover comprises from about 99 to 1 phr of at least one ionomer resin chosen from the group consisting of ethylene-methacrylic acid and ethylene-acrylic acid copolymers neutralized by mono, di or tri-valent metallic derivatives; and from about 1 to 99 phr of at least one non-ionic metallocene catalyzed copolymer of an olefin with a lower alkyl substituent having from about 1 to about 18 carbon atoms.

13. A golf ball having improved spin comprising a core and a cover wherein said cover comprises from about 95 to 5 phr of at least one ionomer resin chosen from the group consisting of ethylene-methacrylic acid and ethylene-acrylic acid copolymers neutralized by mono, di or tri-valent metallic derivatives; and from about 5 to 95 phr of at least one non-ionic metallocene catalyzed copolymer of an olefin with a lower alkyl substituent having from about 1 to about 18 carbon atoms.

14. A golf ball according to claim 12 wherein the cover comprises from about 95–30 percent ionomer and from about 5–70 percent metallocene catalyzed copolymer.

15. A golf ball according to claim 12 wherein the cover comprises from about 95–50 percent ionomer and from about 5–50 percent metallocene catalyzed copolymer.

16. A golf ball according to claim 12 wherein the olefin has a flexural modulus between about 500 psi and about 150,000 psi.

17. A golf ball according to claim 12 wherein the olefinic polymer is a copolymer in which the monomers are selected from the group consisting of butene, hexene, and octene.

18. A golf ball according to claim 12 wherein the olefinic polymer is a copolymer of butene, hexene, or norbornene.

19. A golf ball according to claim 12 wherein the olefinic polymer is a copolymer of ethylene and butene.

20. A golf ball according to claim 12 wherein the olefinic polymer is a copolymer of butene and hexene.

21. A golf ball according to claim 12 wherein the olefinic polymer is a copolymer of ethylene and octene.

22. A golf ball according to claim 13 wherein the olefinic polymer is a copolymer of ethylene and norbornene.

23. A golf ball according to claim 13 wherein the olefinic polymer is a polymer of ethylene and propylene and diene monomer.

24. The golf ball according to claim 1, wherein the ionomer comprises ethylene and methacrylic or acrylic acid.

25. The golf ball according to claim 24, wherein the ionomer is a terpolymer.

26. The golf ball according to claim 8, wherein the ionomers comprise ethylene and methacrylic or acrylic acid.

27. The golf ball according to claim 26, wherein the ionomer is a terpolymer.

28. The golf ball according to claim 11, wherein the ionomer comprises ethylene and methacrylic or acrylic acid.

29. The golf ball according to claim 28, wherein the ionomer is a terpolymer.

* * * * *